United States Patent Office 3,552,936
Patented Jan. 5, 1971

3,552,936
CERTAIN ALKALI METAL AND NITROSYL DIFLUOROCHLORATES AND THEIR PREPARATION
Karl O. Christe, Berkeley, Jacques P. Guertin, El Cerrito, and Attila E. Pavlath, Berkeley, Calif., assignors to Stauffer Chemical Company, New York, N.Y., a corporation of Delaware
No Drawing. Filed Aug. 11, 1965, Ser. No. 478,996
Int. Cl. C01b *21/52;* C01d *11/00*
U.S. Cl. 23—367
5 Claims

ABSTRACT OF THE DISCLOSURE

Difluorochlorates(I) of cesium, rubidium, potassium, and nitrosyl and their preparation by reaction of corresponding fluorides and chlorine monofluoride. Representative compounds are nitrosyl difluorochlorate(I), potassium difluorochlorate(I), rubidium difluorochlorate(I) and cesium difluorochlorate(I).

---

This invention relates to certain new and novel inorganic compositions. In particular, it pertains to new inorganic fluorides and methods for preparing said fluorides.

The existence of ionic complexes containing species such as difluorochlorate(III) cation, $ClF_2^+$, and tetrafluorochlorate(III) anion, $ClF_4^-$, are known and have been described in the chemical literature. These ionic fluorochlorates species are derived from chlorine trifluoride. Complexes containing the species difluorochlorate(I) anion, $ClF_2^-$, have never been prepared or investigated.

A general object of the present invention is, therefore, to provide a new class of chemical compounds which may be represented by the following generic formula:

$$M^+ClF_2^-$$

wherein M is a member selected from the group consisting of nitrosyl, potassium, rubidium, and cesium.

Another object of the present invention is to provide a method of preparing said difluorochlorates(I) of the ions nitrosyl, potassium, rubidium, and cesium.

Pursuant to the above-mentioned and yet further objects, it has been found that the inorganic fluorides, $M^+ClF_2^-$, wherein M is as defined above, may be readily prepared by contacting nitrosyl fluoride or the appropriate metal fluoride with chlorine monofluoride.

In one embodiment of the invention, the fluorides of potassium, rubidium, cesium, or nitrosyl fluoride are contacted with chlorine monofluoride. In a second embodiment of the invention the fluorides of potassium, rubidium, or cesium are contacted with chlorine monofluoride with a catalytic amount of nitrosyl fluoride or nitrosyl difluorochlorate(I) present.

The compounds of this invention, potassium, rubidium, cesium, and nitrosyl difluorochlorate(I) are white solids. The difluorochlorates(I) of potassium, rubidium, and cesium have relatively good thermal stability. The order of decreasing stability was found to be $$Cs^+ClF_2^- > Rb^+ClF_2^- > K^+ClF_2^-$$

Whereas the stability of the compound $NO^+ClF_2^-$ was found to be substantially less than that of the above-mentioned compounds with complete dissociation in the gas phase at 25° C. All of the compounds herein disclosed have excellent oxidizing power and find utility as components in rocket fuel as oxidizers, especially in solid fuel systems. The compounds may also be used as fluorinating agents for organic compounds.

The reactions that may be used to prepare the compounds of the present application are conducted under substantially anhydrous conditions. Because of the nature of the reactants and the characteristics of the products formed, two general methods are used to prepare the above-mentioned compounds. The equipment employed in the preparation of nitrosyl difluorochlorate(I) was a Pyrex-glass high-vacuum system. This equipment was most suitable because of the gaseous nature of the reactants and because of the ease of reaction of the components, chlorine monofluoride and nitrosyl fluoride. In the preparation of the potassium, rubidium, and cesium difluorochlorates(I), the reaction was carried out in a vessel capable of withstanding high pressure and preferably made of material resistant to chemical attack by the reactants, for example, Monel metal. The hydroscopic non-volatile reagents were handled in a dry nitrogen atmosphere glove box and charged into the reactor. The pressure vessel was adapted for connection to a glass vacuum line for introduction of the gaseous reactants after evacuation and subsequent cooling.

In all cases the ratio in which the reactants are used is not critical but for maximum yield of product the chlorine monofluoride is preferably used in large excess. The molar ratio of the reactants in the product is 1:1. It should be pointed out that the formulation of the compounds of the present invention are not promiscuous, but instead are discrete compositions. Generally, at least one mole of chlorine monofluoride is used per mole of nitrosyl fluoride, potassium fluoride, rubidium fluoride, or cesium fluoride. The quantity of chlorine monofluoride can, however, range from a slight excess to as high as 20 moles for each mole of inorganic fluoride. It has been found also that nitrosyl fluoride or nitrosyl difluorochlorate(I) act as catalysts in the preparation of the alkali metal difluorochlorates(I) of the present invention. Therefore, nitrosyl fluoride or nitrosyl difluorochlorate(I) may be added to the reaction of chlorine monofluoride with the alkali metal fluorides to enhance the preparation thereof. The nitrosyl difluorochlorate(I) may be formed in situ from chlorine monofluoride and nitrosyl fluoride or added as a solid at reduced temperature.

The temperature of the reaction is kept as low as operability permits. For reason of the variation in the stability of the products formed, the temperature of preparation of nitrosyl difluorochlorate(I) preferably lies between 0° and —145° C. The pressure employed is generally autogenous and developed between the preferable temperature range. For the preparation of the alkali metal difluorochlorates(I) it is preferable to use temperatures in the range between about 25° to 250° C. The temperature selected will depend upon the thermal stability of the product expected. The pressure employed in the preparation of alkali metal difluorochlorates(I) is generally autogenous and can lie between about 100 pounds per square inch to about 5000 pounds per square inch. The reaction time is between about 2 hours and about 72 hours. Preferably during the reaction period the contents of the reaction vessel are mixed, for example, by mechanical stirring or shaking.

In each case the product was isolated from the reaction mixture by warming said reaction mixtures to a temperature below the dissociation temperature of the expected compound and sufficient to distill the unreacted gaseous portions from the product. The volatile material thus removed can be discarded, or retained and used in subsequent preparations.

The following examples illustrate the preparation of the new compositions of the present invention according to the procedures mentioned hereinabove.

EXAMPLE 1

Preparation of nitrosyl difluorochlorate(I)

In a typical experiment, chlorine monofluiride (11.25 mmoles) was combined under vacuum with nitrosyl fluoride (7.33 mmoles) at −196° C. The mixture was slowly warmed to 0° C., kept at that temperature for 15 minutes, and finally cooled slowly to −120° C. Unreacted chlorine monofluoride (3.99 mmoles) was recovered by distillation at −120° C. Therefore, 7.33 mmoles of nitrosyl fluoride had reacted with 7.26 mmoles of chlorine monofluoride in a mole ratio of 1.01:1, thereby producing the complex, $NO^+ClF_2^-$.

Infrared spectrum of the solid $NO^+ClF_2^-$ was taken by condensing the complex onto the internal silver chloride plate (cooled with liquid nitrogen) of a specially designed low-temperature infrared cell. The spectrum obtained was in agreement with that excepted for such a complex.

*Analysis.*—Calculated for $NO^+ClF_2^-$ (percent): N, 13.5; Cl, 34.3; F, 36.7. Found (percent): N, 12.9; Cl, 32.3; F, 36.0.

EXAMPLE 2

Preparation of the alkali metal difluorochlorates(I)

Chlorine monofluoride and the appropriate alkali metal fluoride were contacted under various conditions at temperatures from 25° to 230° C. under autogeneous pressures. In some reactions agitation was used and in other preparative attempts NOF was also used as a catalyst.

In a typical preparation, cesium fluoride (0.025 mole) was introduced into a 300 ml. Monel metal cylinder having closeable openings on both ends to facilitate removal of solid products. One end of the cylinder was capped and the other end was connected to a pressure gauge by means of high pressure tubing and a control valve. The cylinder was connected to a vacuum system and excess chlorine monofluoride (0.700 mole) was condensed at −196° C. on the cesium fluoride. The cylinder was closed and the mixture heated for 48 hours at 175° C. in an electric tube furnace equipped with an automatic temperature control. An internal pressure of 800 p.s.i. developed. After cooling to 25° C., the volatile material was removed by evacuating the cylinder while heating to 100° C. The non-volatile, white product that remained was removed from the cylinder. The increase in weight of the starting material (cesium fluoride) was determined.

Table I lists the results of several experiments carried out in a similar manner as described above. Included in Table I is the metathetical reaction utilizing catalystic amounts of nitrosyl fluoride.

TABLE I

| Reactants | Moles | Temp., °C. | Time, hrs. | Pressure, p.s.i. | Conversion[1] percent | Calculated Cs | Cl | F | Rb | K | Found Cs | Cl | F | Rb | K |
|---|---|---|---|---|---|---|---|---|---|---|---|---|---|---|---|
| CsF | 0.200 | 175 | 48 | 800 | 55 | 74.8 | 9.4 | 15.8 | | | 73.6 | 9.1 | 16.0 | | |
| ClF | 0.700 | | | | | | | | | | | | | | |
| CsF | 0.035 | 175 | 48 | 1,100 | 80 | 69.0 | | 17.2 | | | 69.5 | | 17.4 | | |
| ClF | 0.210 | | | | | | | | | | | | | | |
| NOF | 0.012 | | | | | | | | | | | | | | |
| RbF | 0.047 | 25 | 24 | 1,100 | 49 | | 10.9 | 21.0 | 68.1 | | | 10.8 | 20.7 | 68.1 | |
| ClF | 0.200 | | | | | | | | | | | | | | |
| NOF | 0.047 | | | | | | | | | | | | | | |
| RbF | 0.036 | 230 | 60 | 1,300 | 73 | | 16.3 | 22.4 | 61.4 | | | 15.3 | 22.3 | 60.6 | |
| ClF | 0.220 | | | | | | | | | | | | | | |
| KF | 0.069 | 150 | 14 | 2,200 | 27 | | 8.5 | 33.0 | | 58.5 | | 8.5 | 33.7 | | 58.2 |
| ClF | 0.390 | | | | | | | | | | | | | | |
| NOF | 0.031 | | | | | | | | | | | | | | |

[1] The conversion to the corresponding difluorochlorate(I) salt was based on the weight increase of starting material.
[2] Analysis was calculated from the weight increase of starting material assuming the product to be composed of a mixture of the difluorochlorate(I) and unreacted alkali metal fluoride only.

The infrared spectra of the compounds were made and found to be in agreement with expected spectra, especially the absorption of the $ClF_2^-$ anion at 636 cm.$^{-1}$. Differential thermal analysis indicated exothermic decompositions at 262°, 248°; and 237° C. for the cesium, rubidium, and potassium difluorochlorate(I), respectively.

Various changes and modifications may be made without departing from the spirit and scope of the invention described herein as will be apparent to those skilled in the art to which it pertains. It is accordingly intended that the present invention shall only be limited by the scope of the appended claims.

We claim:

1. The compound, nitrosyl difluorochlorate(I).

2. The process of preparing at least one member of the group consisting of the difluorochlorates(I) of nitrosyl, potassium, rubidium, and cesium, comprising contacting, under substantially anhydrous conditions, chlorine monofluoride with at least one member of the group consisting of nitrosyl fluoride, potassium fluoride, rubidium fluoride, and cesium fluoride, and isolating the product therefrom.

3. The process of preparing nitrosyl difluorochlorate(I) comprising contacting, under substantially anhydrous conditions, chlorine monofluoride and nitrosyl fluoride at temperatures between about 0° C. and −145° C. and isolating the product therefrom.

4. The process of preparing the difluorochlorate(I) of potassium, rubidium, or cesium, comprising contacting, under substantially anhydrous conditions, chlorine monofluoride and an alkali metal fluoride selected from the group consisting of potassium, rubidium, and cesium at autogenous pressure at temperatures between about 25° C. and 250° C. and isolating the product therefrom.

5. The process of preparing the difluorochlorate(I) of potassium, rubidium, or cesium, comprising contacting under substantially anhydrous conditions, chlorine monofluoride and an alkali metal fluoride selected from the group consisting of potassium fluoride, rubidium fluoride, and cesium fluoride, in the presence of a catalytic amount of nitrosyl difluorochlorate(I) or nitrosyl fluoride at autogeneous pressure at temperatures between about 25° C. and 250° C. and isolating the product therefrom.

References Cited

UNITED STATES PATENTS 3,361,543   1/1968   Tsigdinos et al. _____ 23—367

OTHER REFERENCES

Sneed et al.: Comprehensive Inorganic Chemistry, vol. III, 1954, The Halogens, pp. 190–191, 193, 216.

OSCAR R. VERTIZ, Primary Examiner

H. S. MILLER, Assistant Examiner

U.S. Cl. X.R.

23—50